United States Patent [19]

Willner

[11] Patent Number: 5,414,968
[45] Date of Patent: May 16, 1995

[54] LIGHT-DIFFUSING GLASS BRICK HAVING EMBOSSED INTERNAL SURFACE

[75] Inventor: Winfried Willner, Haltern, Germany

[73] Assignee: Saint-Gobain Vitrage International, Aubervilliers, France

[21] Appl. No.: 70,882

[22] Filed: Jun. 3, 1993

[30] Foreign Application Priority Data

Jun. 3, 1992 [DE] Germany .................. 42 18 215.8

[51] Int. Cl.⁶ ............................................. E04B 5/46
[52] U.S. Cl. ............................................. 52/306
[58] Field of Search ................................... 52/306

[56] References Cited

U.S. PATENT DOCUMENTS

| | | | |
|---|---|---|---|
| 2,194,756 | 3/1940 | Kell | 52/306 |
| 2,532,478 | 12/1950 | Bridges | 52/306 |
| 5,009,048 | 4/1991 | Paul | 52/306 |
| 5,033,245 | 7/1991 | Kline | 52/306 |
| 5,038,542 | 8/1991 | Kline | 52/306 |
| 5,067,295 | 11/1991 | Francik | 52/306 |
| 5,109,644 | 5/1992 | Poremba | 52/306 |
| 5,160,566 | 11/1992 | Ashby | 52/306 X |

FOREIGN PATENT DOCUMENTS 1082385  5/1960  Germany ...................... 52/306

*Primary Examiner*—Carl D. Friedman
*Assistant Examiner*—Beth A. Aubrey
*Attorney, Agent, or Firm*—Oblon, Spivak, McClelland, Maier & Neustadt

[57] ABSTRACT

A hollow glass brick consists of two half-bricks (1, 2) fused to one another. On the internal surface of at least one of its walls (4, 5) provided for the passage of light, there is provided a finely structured surface embossing. The surface embossing is made of a design having a wavy profile whose wavelength is 200 to 1000 μm and whose wave depth 10 to 80 μm. These embossed fine structures give the impression of glass bricks having frosted interior surfaces. They prevent one from seeing through the brick and provide a high degree of diffusion.

10 Claims, 1 Drawing Sheet

LIGHT-DIFFUSING GLASS BRICK HAVING EMBOSSED INTERNAL SURFACE

BACKGROUND OF THE INVENTION

1. Field of the Invention

This invention relates to a light-diffusing hollow glass brick composed of two half-bricks.

2. Description of the Related Art

As a general rule, hollow glass bricks are produced by fusing to one another two half-bricks produced by a pressing process. In this case, it is common to provide the wall of at least one of the half-bricks with an ornamental, decorative or light-deflecting impression. These glass bricks keep their transparency to a certain extent. Due to the design of the impression, the light is often deflected in determined, preferred directions.

Glass bricks are also known that scatter or diffuse the light to a large extent. These glass bricks, when they are part of an exterior wall of a room, make possible a very uniform lighting of the room independently of the angle of incidence of the light rays. In addition, they make the glass translucent, quite like opal glass.

A known light-diffusing glass brick contains fine particles in the bulk of the glass, for example particles of sodium sulfate or sodium sulfide in a dispersed state (document DE-38 20 600 A1). In this case, the glass is an opal glass having reduced overall transparency which, for a glass thickness of 10 mm, is between 20 and 80% in the wave length range of 400 to 700 nm. These glass bricks can be produced only by use of special glass compositions having an appreciably increased sulfur content. However, the process of melting these glasses is disturbing for the environment.

Further, it is known to make a glass brick with scattering or diffusion of light by frosting, e.g., by sandblasting or acid treatment (document DE-GM 1 874 435), of the exterior surface of the wall intended for the passage of light. These frosted surfaces are very susceptible to soiling. Moreover, they lose their light diffusion effectiveness when they are wet, for example in case of rain. Surface frosting, in addition, involves an additional treatment step, which inevitably increases the cost of the product.

SUMMARY OF THE INVENTION

The present invention has as an object to obtain a hollow brick with a high degree of light scattering, which can be produced from the same glass compositions as the glass bricks with ornamental impressions and which can be produced in a particularly economical way, i.e., without an additional treatment step. The exterior surfaces of the glass brick must, in addition, not be susceptible to soiling and must not be susceptible to atmospheric influences.

In the glass brick according to the invention, the interior surface of a light transmitting wall of at least one of the half-bricks forming the complete brick is provided with a surface embossing having a pattern with a wavy or undulating profile whose wave length is between 200 and 1000 $\mu$m and whose wave depth is between 10 and 80 $\mu$m.

The glass brick according to the invention is provided, on the exterior side, with an embossing that is so fine that the visual impression and the optical efficiency of the wall are not altered thereby.

It should be noted that the embossed interior surface need not undergo a subsequent surface treatment. In comparison with glass surfaces made rough in a subsequent mechanical step, the embossed glass surface according to the invention is less susceptible to damage because the surface of the glass, despite its fine structure, does not exhibit any microscopic surface abrasions.

It is particularly advantageous that the surface scattering of the light be on the interior side of the hollow glass brick. This means that the rough or dull surface is protected in a lasting way and that it is not subject to any unfavorable mechanical influence, for example during a cleaning or exposure to atmospheric influences. Further, no particular measure of preparation or protection is necessary, either during transport, during the incorporation of the glass bricks into a building or during cleaning with common cleaning agents and devices.

The wavy profile of the embossed surface design preferably has surface undulating with a wave length of 400 to 800 $\mu$m and, in particular, 300 to 600 $\mu$m, while the depth of the undulations is preferably between 20 and 50 $\mu$m.

The surface embossing of the bricks according to the invention can also exhibit an aperiodic pattern, particularly long rises or peaks and narrow hollows or troughs and with no preferred direction.

The glass bricks according to the invention are made of a glass of common composition for glass bricks. Their manufacture is performed in an ordinary manner by pressing each half-brick between a die and a counter or pressing die, then by assembling the half-bricks by fusing or gluing the two half-bricks.

To obtain the desired surface structure on the inner surface of the half-bricks, a pressing die is used whose face exhibiting the embossed structure has been treated by an erosion process, in particular by electroerosion or by sandblasting. The erosion conditions are selected so that the surface structure described above is attained. The desired surface structure is preferably produced on the pressing die by electroerosion using a suitable machine, the erosion conditions being adjusted, for example, so that a surface structure is obtained having a depth of roughness 36 according to VDI 3400.

The surface of the glass brick provided with the rough structure described above can be a plane surface. In this case, the glass brick gives the impression of an opal glass brick with smooth surfaces. The desired effect of diffusion of the light can, however, also be produced in glass bricks which exhibit an ornamental structure or another simple structure. In this case, the surfaces of the die exhibiting the ornamental structure or the simple structure are additionally provided with the rough structure according to the invention obtained by erosion treatment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENT

Figure 1:
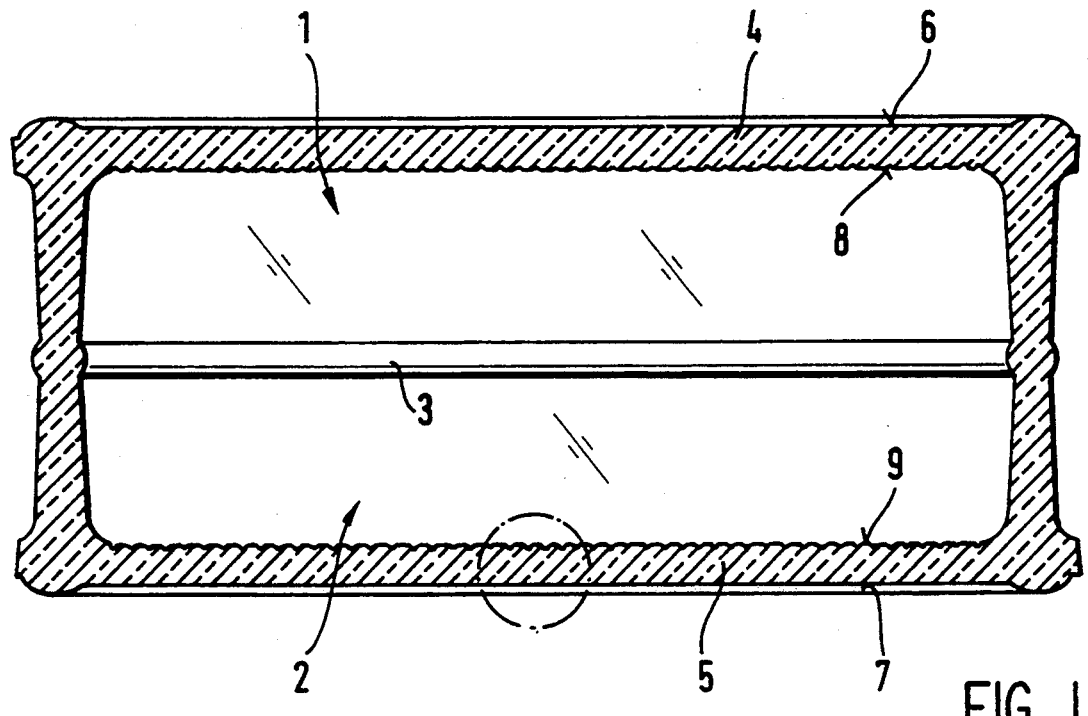
FIG. 1 shows a glass brick according to the invention in section.
Figure 2:
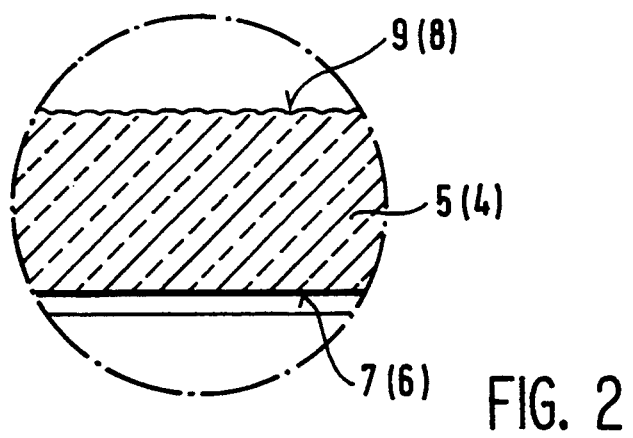
FIG. 2 shows a detail of the glass brick of FIG. 1.

The glass brick is made of two half-bricks 1 and 2 whose wings are connected to one another by fused or glued joint 3. Walls 4 and 5 of the glass brick, which are intended for the passage of light, have plane and smooth exterior surfaces 6 and 7 which are obtained as a result of the corresponding surface of the pressing die being polished and plane. Interior surfaces 8 and 9 of walls 4 and 5 of the glass brick, on the other hand, exhibit the fine structure according to the invention.

Surfaces 8 and 9 are, for example, provided with a rough structure having a wavy profile which does not exhibit a preferred direction and is formed by longitudinal rises or peaks and narrow hollows or troughs. The wave length of the profile, i.e., the distance between two hollows, is located in the range between 300 and 600 $\mu$m and the wave depth is at most about 50 $\mu$m. Since surfaces 8 and 9 exhibiting this rough structure are otherwise plane, the diffusion or the scattering of the light rays comes exclusively from the fine structure of surfaces 8 and 9.

A glass brick thus designed exhibits, in the case of an ordinary wall thickness of these bricks and of common glass composition, an overall transmission of light of about 80%. In case of the fine structure described by way of example, 56% of the light passing through the glass brick is scattered and diffused while 44% of the light passes through the glass brick without changing the direction of the radiation.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A light diffusing hollow glass brick formed of two half-bricks and having walls capable of passing light, wherein an internal surface of at least one of said walls is embossed with a wavy profile such that light passing through said at least one wall is scattered and diffused, said wavy profile comprising surface undulations with a wavelength of 200–1000 $\mu$m and a wave depth of 10–80 $\mu$m.

2. The brick of claim 1 wherein said wavy profile comprises a plurality of aperiodic and non-directional undulations having long crests and narrow troughs.

3. The brick of claim 1 wherein said wavelength is 400–800 $\mu$m and said wave depth is 20–50 $\mu$m.

4. The brick of claim 1 wherein the internal surface of said at least one of said walls is planar and parallel to a corresponding external surface.

5. The brick of claim 1 wherein the internal surface of said at least one wall further comprises an ornamental pattern.

6. The brick of claim 1 wherein said two half-bricks are fused together.

7. The brick of claim 1 wherein said two half-bricks are glued together.

8. The brick of claim 1 wherein said half-bricks are each formed by pressing between two dies, one of said dies having been treated by an electroerosion process to form said wavy profile.

9. The brick of claim 1 wherein said half-bricks are each formed by pressing between two dies, one of said dies having been treated by a sandblasting process to form said wavy profile.

10. The brick of claim 3 wherein said wavelength is 300–600 $\mu$m.

* * * * *